United States Patent
Watson et al.

(10) Patent No.: US 11,776,070 B2
(45) Date of Patent: *Oct. 3, 2023

(54) SYSTEMS AND METHODS FOR PARTICIPATIVE SUPPORT OF CONTENT-PROVIDING USERS

(71) Applicant: Heir Apparent, Inc., Los Angeles, CA (US)

(72) Inventors: Summer Watson, Los Angeles, CA (US); Lynette Perkins, Austin, TX (US)

(73) Assignee: Heir Apparent, Inc., Los Angeles, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/498,301

(22) Filed: Oct. 11, 2021

(65) Prior Publication Data

US 2022/0277401 A1    Sep. 1, 2022

Related U.S. Application Data

(63) Continuation of application No. 17/186,312, filed on Feb. 26, 2021, now Pat. No. 11,151,665.

(51) Int. Cl.
*G06Q 20/10*    (2012.01)
*G06Q 50/00*    (2012.01)
*G06Q 40/12*    (2023.01)

(52) U.S. Cl.
CPC .............. *G06Q 50/01* (2013.01); *G06Q 20/10* (2013.01); *G06Q 40/12* (2013.12)

(58) Field of Classification Search
CPC ......... G06Q 50/01; G06Q 40/12; G06Q 20/10

(Continued)

(56) References Cited

U.S. PATENT DOCUMENTS 8,032,409 B1 *  10/2011  Mikurak ............... G06Q 30/00
                                                    705/14.39
8,050,987 B2    11/2011  Liu
                          (Continued)

OTHER PUBLICATIONS

Greenstein et al., "Net Neutrality: A Fast Lane to Understanding the Trade-offs", Journal of Economic Perspectives—vol. 30, No. 2, Spring 20167, pp. 127-150, (Year: 2013).*

(Continued)

*Primary Examiner* — Frantzy Poinvil
(74) *Attorney, Agent, or Firm* — ESPLIN & ASSOCIATES, PC (57) ABSTRACT

Systems and methods for facilitating participative support among users are disclosed. The users may include content-providing users that provide user-provided content to other users. Exemplary implementations may: obtain items of user-provided content; effectuate presentations of the items of user-provided content through user interfaces to the users; receive revenue information from the users, wherein the revenue information represents received revenue for the content-providing users, including a participative-support exchange between a second user and the content-providing user of an amount of a currency being exchanged for a portion of particular (future) revenue received by the content-providing user; determine the particular revenue for the content-providing user, based on the received revenue information; determine and distribute the portion of the particular revenue to the second user, in accordance with the participative-support exchange.

20 Claims, 4 Drawing Sheets

(58) Field of Classification Search
USPC .................................................. 705/3–44
See application file for complete search history.

(56) References Cited

U.S. PATENT DOCUMENTS

| | | | |
|---|---|---|---|
| 8,145,526 B2 | 3/2012 | Redlich | |
| 8,249,960 B2 * | 8/2012 | Cooper | G06Q 20/04 |
| | | | 705/34 |
| 8,554,601 B1 | 10/2013 | Marsh | |
| 8,561,099 B2 | 10/2013 | Demirtshian | |
| 9,398,340 B2 | 7/2016 | Farb | |
| 9,760,916 B1 | 9/2017 | Shapiro | |
| 9,872,075 B2 | 1/2018 | Farb | |
| 9,942,189 B2 | 4/2018 | Green | |
| 10,769,678 B2 | 9/2020 | Li | |
| 11,151,665 B1 | 10/2021 | Watson | |
| 2004/0133793 A1 * | 7/2004 | Ginter | H04N 21/235 |
| | | | 375/E7.009 |
| 2004/0225577 A1 | 11/2004 | Robinson | |
| 2005/0091075 A1 | 4/2005 | Cohen | |
| 2009/0083779 A1 | 3/2009 | Shteyn | |
| 2009/0157486 A1 | 6/2009 | Gross | |
| 2009/0327057 A1 | 12/2009 | Redlich | |
| 2010/0082353 A1 * | 4/2010 | Larson | G06Q 30/0208 |
| | | | 705/1.1 |
| 2010/0332296 A1 | 12/2010 | Gharabally | |
| 2011/0143811 A1 * | 6/2011 | Rodriguez | H04N 1/00244 |
| | | | 455/556.1 |
| 2011/0145043 A1 | 6/2011 | Handel | |
| 2012/0130860 A1 | 5/2012 | Suzuki | |
| 2012/0158527 A1 | 6/2012 | Cannelongo | |
| 2014/0136305 A1 | 5/2014 | Blumenthal | |
| 2015/0095154 A1 * | 4/2015 | Kannan | G06Q 50/01 |
| | | | 705/14.55 |
| 2016/0048903 A1 | 2/2016 | Fujioka | |
| 2016/0078490 A1 * | 3/2016 | Tumen | G06Q 30/0269 |
| | | | 705/14.66 |
| 2016/0162924 A1 | 6/2016 | Rathod | |
| 2018/0197156 A1 * | 7/2018 | Beesley | H04L 12/1407 |
| 2018/0330281 A1 | 11/2018 | Teller | |
| 2019/0180307 A1 | 6/2019 | Cohen | |
| 2019/0197609 A1 * | 6/2019 | Na | G06F 7/02 |
| 2019/0268642 A1 | 8/2019 | Canney | |
| 2020/0394473 A1 | 12/2020 | Dudik | |

OTHER PUBLICATIONS

Jecko, "Digital media asset management", Broadcast Engineering 52.6:8, Future Publishing Ltd., ProQuest Document Id: 518329180, Jun. 2010.

* cited by examiner

SYSTEMS AND METHODS FOR PARTICIPATIVE SUPPORT OF CONTENT-PROVIDING USERS

FIELD OF THE DISCLOSURE

The present disclosure relates to systems and methods for facilitating participative support among users, wherein the users include content-providing users that provide user-provided content to other users.

BACKGROUND

Online platforms that allow users to share content are known. Online platforms that allow users to publish user-provided content are known. Online platforms that allows users to rate, rank, and/or otherwise vote on posted content are known, such as, by way of example, YouTube™, Facebook™, and Reddit™.

SUMMARY

One aspect of the present disclosure relates to a system or systems configured for participative support among users. The system may include electronic storage media, one or more servers, one or more hardware processors configured by machine-readable instructions, and/or other components. The processor(s) may be configured to store information. The stored information may include user account information related to user accounts. The user accounts may be associated with the users such that a first user account is associated with the content-providing user and a second user account is associated with the second user. First account information may be related to the first user account. Second account information may be related to the second user account. The processors may be configured to maintain the user accounts associated with the users. The processors may be configured to obtain items of user-provided content. The items may include audio information. The items may be associated with the content-providing users such that a first item of user-provided content is associated with the content-providing user who provided the first item. The first item may include first audio information. The processors may be configured to effectuate presentations of the items of user-provided content through user interfaces to the users. The processors may be configured to receive revenue information from the users. The revenue information may represent received revenue for the content-providing users. The received revenue may be a combination of one or more types of revenue source. The one or more types of revenue source may include donations and participative-support exchanges. A one-time donation may be an individual donation from an individual user to an individual content-providing user. A participative-support exchange may be a particular exchange between the second user and the content-providing user of an amount of a currency being exchanged for a portion of particular revenue received by the content-providing user. The particular revenue may be based on received revenue information. The processors may be configured to determine the particular revenue for the content-providing user, based on the received revenue information. The processors may be configured to determine and distribute the portion of the particular revenue to the second user, in accordance with the participative-support exchange.

Another aspect of the present disclosure relates to a method or methods for facilitating participative support among users. The method may include storing information. The stored information may include user account information related to user accounts. The user accounts may be associated with the users such that a first user account is associated with the content-providing user and a second user account is associated with the second user. First account information may be related to the first user account. Second account information may be related to the second user account. The method may include maintaining the user accounts associated with the users. The method may include obtaining items of user-provided content. The items include audio information. The items are associated with the content-providing users such that a first item of user-provided content is associated with the first content-providing user who provided the first item. The first item may include first audio information. The method may include effectuating presentations of the items of user-provided content through user interfaces to the users. The method may include receiving revenue information from the users. The revenue information may represent received revenue for the content-providing users. The received revenue may be a combination of one or more types of revenue source. The one or more types of revenue source may include one-time donations and participative-support exchanges. A one-time donation may be an individual donation from an individual user to an individual content-providing user. A participative-support exchange may be a particular exchange between the second user and the content-providing user of an amount of a currency being exchanged for a portion of particular revenue received by the content-providing user. The particular revenue is based on received revenue information. The method may include determining the particular revenue for the content-providing user, based on the received revenue information. The method may include determining and distributing the portion of the particular revenue to the second user, in accordance with the participative-support exchange.

As used herein, any association (or relation, or reflection, or indication, or correspondency) involving servers, processors, client computing platforms, user-provided content, presentations, ratings, rating information, users, accounts, account information, ranking metrics, experience metrics, values, comparisons, correlations, accuracies, determinations, assets, offers, transactions, revenue information, revenue, donations, exchanges, rights, benefits, ownership, instructions, operations, distributions, transfers, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
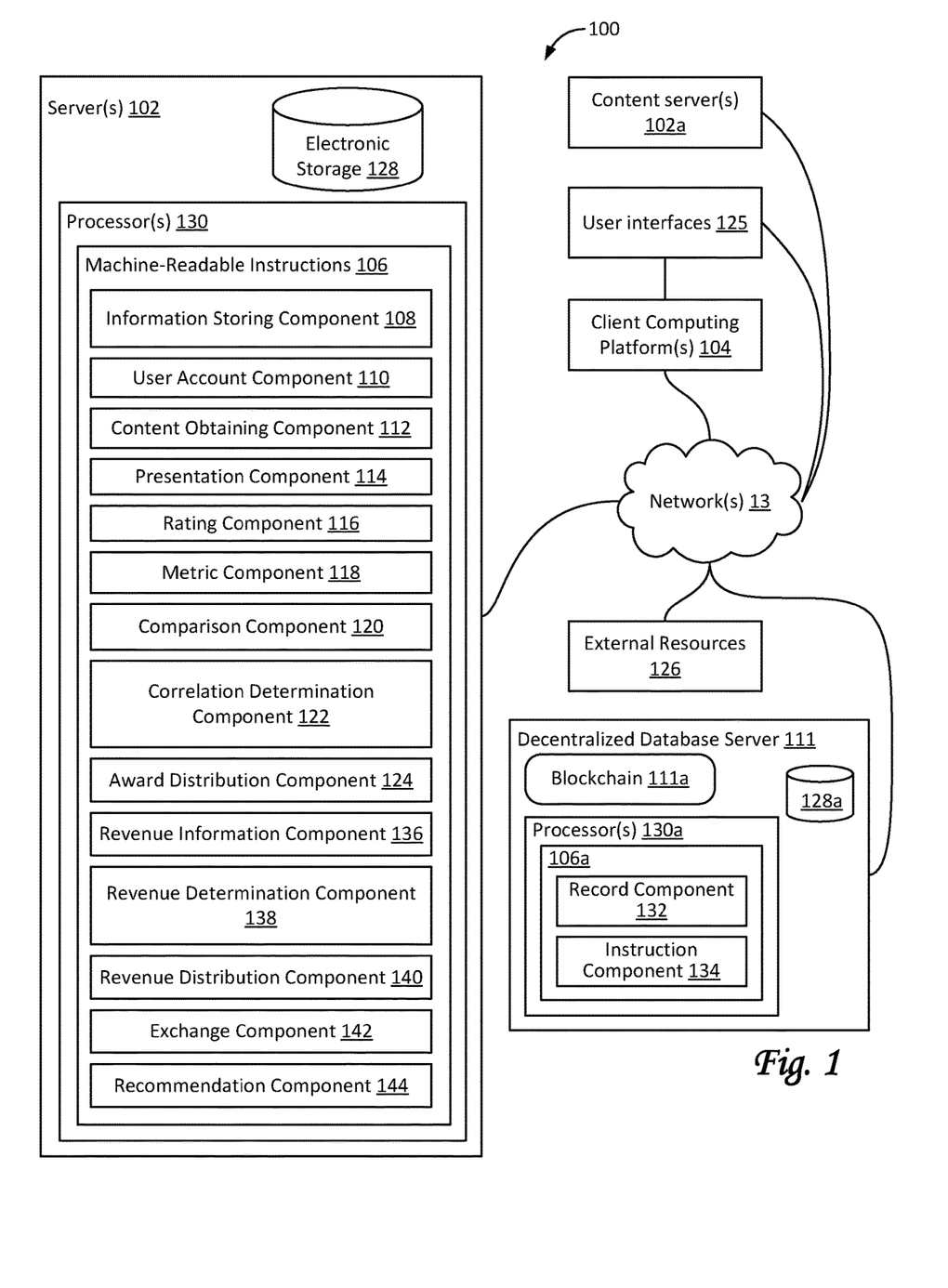
FIG. 1 illustrates a system configured for determining and rewarding accuracy in predicting ratings of user-provided content that is provided and rated by users, in accordance with one or more implementations.

FIG. 1 illustrates a system 100 configured for participative support among users, in accordance with one or more implementations. The users may include, by way of non-limiting example, content-providing users that provide user-provided content to other users. As used herein, the term "user-provided content" may refer to content (particularly digital content) that includes audio information, including but not limited to songs, music, spoken word, interviews, comedy, theatre, podcasts, and/or other forms of information and/or entertainment. In some implementations, users may provide ratings for the user-provided content. As used herein, the term "rating" may refer to a representation of an assessment and/or evaluation of the quality and/or merit of a particular item of content, and/or of an expectation or prediction thereof to be provided by multiple users. For example, a basic rating may represent whether a user likes or dislikes a song, and/or a prediction whether a majority of other users will like or dislike the same song.

In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104, e.g., through user interfaces 125. The users may include content-providing users, rating-providing users, and/or other types of users. For example, the users may include a first user, a second user, a third user, and so forth. For example, the content-providing users may include a first content-providing user, a second content-providing user, and so forth. For example, the rating-providing users may include a first rating-providing user, a second rating-providing user, and so forth. In some implementations, an individual user may be both a content-providing user and a rating-providing user. In some implementations, the first content-providing user may be associated with a first client computing platform 104 (and a first user interface 125), the second rating-providing user may be associated with a second client computing platform 104 (and a second user interface 125), and so forth.

Server(s) 102 may be configured by machine-readable instructions 106. Machine-readable instructions 106 may include one or more instruction components. The instruction components may include computer program components. The instruction components may include one or more of an information storing component 108, a user account component 110, a content obtaining component 112, a presentation component 114, a rating component 116, a metric component 118, a comparison component 120, a correlation determination component 122, an award distribution component 124, a record component 132, an instruction component 134, a revenue information component 136, a revenue determination component 138, a revenue distribution component 140, an exchange component 142, a recommendation component 144, and/or other components. In some implementations, server(s) may include one or more content servers 102a. In some implementations, content server(s) 102a may be configured to effectuate presentations of user-provided content.

Information storing component 108 may be configured to store information in electronic storage 128 and/or other electronic storage. The stored information may include user account information related to user accounts of the users. Individual ones of the user accounts may be associated with individual ones of the users. For example, a first user account may be associated with a first user (e.g., a content-providing user), a second user account may be associated with a second user, and so forth. First account information may be related to the first user account, second account information may be related to the second user account, and so forth. In some implementations, information storing component 108 may be configured to record and/or otherwise store information in blockchain 111a.

In some implementations, (user-specific) account information may include one or more metrics. For example, an experience metric may represent an amount of experience by a user in providing the user-provided content. Alternatively, and/or simultaneously, an experience metric may represent an amount of (a particular type of) ratings received by the user that has provided user-provided content (e.g., more favorable ratings may increase the represented amount and/or the corresponding experience metric). For example, a different experience metric may represent an amount of experience by a particular user in providing ratings of the individual items of user-provided content. Alternatively, and/or simultaneously, a different experience metric may represent an amount (a particular type of) ratings provided by the particular user that has provided ratings of the individual items of user-provided content (e.g., more accurate ratings may increase the represented amount and/or the corresponding experience metric). In some implementations, the one or more metrics may include a metric that represents success and/or accuracy in predicting (user-provided) ratings for user-provided content. In some implementations, account information may include a balance of a digital asset, including but not limited to one or more currencies. In some implementations, account information may link and/or otherwise refer to blockchain 111a.

In some implementations, (user-specific) account information may include revenue information, information regarding donations, information regarding participative-support exchanges, information regarding ownership rights and/or distribution rights pertaining to participative-support exchanges, and/or other information. In some implementations, account information may link and/or otherwise refer to blockchain 111*a*.

User account component 110 may be configured to manage and/or maintain the user accounts associated with the users. In some implementations, maintaining the user accounts may include managing user-specific inventories. For example, an inventory may include digital assets, currencies, balances of metrics (e.g., a particular value for a particular metric, including but not limited to experience metrics), virtual items, and/or other items. In some implementations, maintaining user accounts may include modifying the user account information. In some implementations, at least some account information may be recorded and/or otherwise stored in blockchain 111*a*.

Content obtaining component 112 may be configured to obtain individual items of user-provided content. The individual items may include audio information. In some implementations, the individual items may include audio-visual information. The individual items may be associated with individual ones of the individual users who provided the individual items such that a first item of user-provided content is associated with the first content-providing user who provided the first item. The first item of user-provided content may include first audio information. For example, a particular item of user-provided content may include a song and/or another piece of music. For example, the content-providing user who has provided the particular item may be the artist who created that particular song. Different content-providing users may provide different songs such that content obtaining component 112 may obtain the individual different songs for presentation to other users, including but not limited to rating-providing users who provide ratings. In some implementations, content obtaining component 112 may be configured to host user-provided content. In some implementations, content obtaining component 112 may be configured to obtain user-provided content from one or more other servers, hosts, distribution platforms, and/or other providers, including but not limited to YouTube™, SoundCloud™, and/or other service providers. In some implementations, content obtaining component 112 may be configured to provide access to user-provided content, e.g., through a uniform resource locator (URL), a uniform resource identifier, a link, a code, and/or other information that refers to particular user-provided content.

Presentation component 114 may be configured to effectuate presentations to individual users, e.g., through client computing platforms 104 and/or user interfaces 125. In some implementations, individual items of user-provided content may be associated with individual content-providing users (e.g., the respective creators of the user-provided content). In some implementations, presentation component 114 may be configured to effectuate presentations of the individual items of user-provided content to the individual users. For example, presentation component 114 may effectuate a first presentation, through a particular client computing platform 104 and/or a particular user interface 125, to a particular (rating-providing) user. For example, presentation component 114 may effectuate a second presentation, through a different client computing platform 104 and/or a different user interface 125, to a different (rating-providing) user. For example, a particular presentation may include a particular item of user-provided content. In some implementations, the same item of user-provided content may be presented separately to multiple users, through multiple presentations. In some implementations, user interfaces 125 may be configured to receive user input from the (rating-providing) users. For example, through presentation component 114, one or more songs may be presented to one or more rating-providing users (e.g., via user interfaces 125 that are presented to the rating-providing users).

In some implementations, the same user interfaces may be used to both present items of user-provided content as well as receive user input from rating-providing users. In some implementations user input may be (rating-providing) user-specific and/or (user-provided) content-specific. For example, particular user input from a particular rating-providing user may represent a rating by the particular rating-providing user of a particular item of user-provided content (say, a particular song). For example, a rating may be positive or negative. In some implementations, a rating may be positive, negative, and/or neutral. In some implementations, a rating may be represented numerically. For example, a rating-providing user may rate a song positively or negatively (e.g., using 👍 and 👎). In some implementations, a rating may represent an expectation and/or prediction of how the majority of rating-providing users will rate and/or like the particular song. In some implementations, user-provided content may be presented at the same time as and/or contemporaneously with the provision of a rating from the rating-providing user. For example, the particular song is presented to the particular rating-providing user (using a particular user interface 125). While the particular song is playing (and/or, in some implementations, shortly thereafter), the particular rating-providing user can provide user input that represents the rating by the particular rating-providing user of the particular song (e.g., using the same particular user interface 125).

In some implementations, presentation component 114 may effectuate a particular individual presentation to individual users through which the individual users can initiate and/or facilitate support for a content-providing user. In some implementations, support may be implemented as one or more types of revenue source for content-providing users. In some implementations, individual types of revenue source may provide individual types of revenue. For example, a particular type of revenue source may be sales of one or more individual items of user-provided content. For example, a particular type of revenue source may be rent and/or lease of one or more individual items of user-provided content (e.g., granting certain usage rights for a limited time). For example, a particular type of revenue source may be donations to a content-providing user. For example, donations may be a one-time donation or tip. In some implementations, donations may include recurring and/or repeated donations and/or tips for a particular content-providing user. For example, a particular type of revenue source may be participative-support exchanges for an individual content-providing user. For example, a particular participative-support exchange may be an exchange between a particular content-providing user and another user. The exchange may exchange an amount of a currency for a portion of particular revenue. For example, the particular revenue may be revenue that is to be received (e.g., subsequent to the particular participative-support exchange) by the particular content-providing user. The particular revenue may be based on revenue from one or more types of revenue source. For example, in a given participative-support exchange, a given user may exchange $1000 for a 1% share of future donations (and/or one or more particular types of revenue) to a given content-providing user (who receives the $1000 from the given user). The given user may thus support the given content-providing user. Responsive to the content-providing user receiving more than $100K in donations (subsequent to this given participative-support exchange), the given user may recoup part of the $1000, all of $1000, or more than $1000, depending on the particular conditions related to this given participative-support exchange.

Rating component 116 may be configured to receive rating information. In some implementations, rating component 116 may be configured to receive rating information based on input received from individual users through user interfaces 125. The input may include one or more positive ratings, one or more negative ratings, and/or other ratings. Rating information may be based on the received user input from one or more rating-providing users. In some implementations, particular individual user input may indicate a particular rating from a set of rating options. In some implementations, a set of rating options may include one or more positive rating options, one or more negative rating options, and/or zero or more other rating options. For example, in some implementations, the set of rating options may include "like" and "dislike", or "fire" and "trash", or "thumbs up" and "thumbs down." For example, in some implementations, the set of rating options may include "like", "dislike", and "neutral," or "fire", "trash", and "needs work", or "thumbs up", "thumbs down", and "meh". For example, in some implementations, the set of rating options may be a numerical scale, from 0 to 100, from 1 to 10, from 1 to 5, and so forth. For example, in some implementations, the set of rating options may be a letter grade (say, from "A" to "F"). Other rating options (numerical, non-numerical, and/or a mix of both) are considered within the scope of this disclosure. In some implementations, rating options may be represented using a graphical element, such as, for example, an icon or image.

Metric component 118 may be configured to determine values for metrics. In some implementations, the metrics may include ranking metrics of the individual items of user-provided content. In some implementations, the metrics may include experience metrics related to individual users. In some implementations, determination of the values for the ranking metrics may be based on information received from rating component 116. In some implementations, determination of the values for the ranking metrics may be based on the received rating information such that a first determination of a first value for a first ranking metric of a first item (of user-provided content) is based at least in part on the received user input from one or more particular (rating-providing) users. Metric component 118 may be configured to determine values for ranking metrics of individual ones of the users. For example, an experience metric (related to a particular content-providing user) may be based at least in part on a particular ranking metric of a particular item (that has been provided by the particular content-providing user). In some implementations, determinations by metric component 118 may be based on aggregating numerical information. For example, the total number of positive ratings may be used to determine a particular ranking metric (e.g., a song's ranking metric may be 10,000 likes). For example, the ratio of positive versus negative ratings may be used to determine a particular ranking metric (e.g., a song's ranking metric may be 80% positive). For example, the average rating of numerical ratings may be used to determine a particular ranking metric (e.g., a song's ranking metric may have a value of 3.5 out of 5 stars). In some implementations, multiple ranking metrics may be combined and/or otherwise aggregated to determine a specific ranking metric.

An experience metric for a particular content-providing user may be based on ranking metrics for items of content provided by the particular content-providing user. For example, the particular experience metric may have a value of 50,000 likes, an average of 65% positive ratings, and so forth. An experience metric for a particular rating-providing user may be based on ranking metrics for items of content for which the particular rating-providing user has provided a rating. For example, the experience metric may have a value of 500 ratings (e.g., "likes" and "dislikes" combined), an average of 65% positive ratings, an accuracy value of 80%, and so forth. As used herein, accuracy may be determined by comparing the rating from the particular user with ratings from other users. For example, if the particular user liked a song, and the majority of the other users who provided a rating for the same song also like the song, the accuracy of the particular user may increase (in particular, the accuracy of the particular rating of liking this song). For example, if the particular user disliked a song, and the majority of the other users who provided a rating for the same song also dislike the song, the accuracy of the particular user may increase (in particular, the accuracy of the particular rating of disliking this song). Conversely, if the particular user liked a song, and the majority of the other users who provided a rating for the same song disliked the song, the accuracy of the particular user may decrease (in particular, the accuracy of the particular rating of liking this song). Likewise, if the particular user disliked a song, and the majority of the other users who provided a rating for the same song liked the song, the accuracy of the particular user may decrease (in particular, the accuracy of the particular rating of disliking this song).

In some implementations, determinations by metric component 118 may take other information into account. For example, if rating-providing users can provide user input (corresponding to rating information) prior to the presentation of particular user-provided content being completed, the moment of rating/voting/providing the user input may be relevant to the determinations by metric component 118. For example, user input provided after the first 10 (or 20, or 30, or 60) seconds of presenting a particular song may be weighed more heavily (or, in some implementations, less heavily) as user input provided after the first 10 (or 20, or 30, or 60) seconds of the presentation of the particular song, or after the entire song has completed. In some implementations, rating information may be weighed differently based on the number of rating-providing users that have provided user input regarding particular user-provided content. For example, in some cases, earlier rating/voting may outweigh later rating/voting. For example, in some cases, rating/voting provided after some threshold event (e.g., the $1000^{th}$ vote, or the $1000^{th}$ positive vote, and so forth) may be counted less, or not at all. The rationale may be, in some implementations, that additional users jumping on the bandwagon after particular content (say, a song) has become popular (at least with the users of system 100) has less value and/or information than the (potentially more independent) opinions/ratings/votes of the earliest group of rating-providing users. Determinations by metric component 118 pertaining to a particular rating-providing users may be based, at least in part, on actions by other rating-providing users (and/or the timing of actions by other rating-providing users).

In some implementations, accurate rating may be valued more if the particular accuracy was rare. For example, assume only 100 rating-providing users provide a rating for a particular song (e.g., in a particular period of time, such as an early-rating period). Further assume that much later, after a million ratings, the song has become very popular. If only 1 rating-providing user in the set of the first 100 rating-providing users provided a positive rating, this accuracy should be deemed more valuable (and awarded accordingly) than when 99 ratings users in the set of the first 100 rating-providing users provided a positive rating.

Comparison component 120 may be configured to make comparisons involving (values of) ranking metrics, rating information, and/or other information. For example, a comparison may compare a particular value for a particular ranking metric of a particular item (of user-provided content) with particular rating information for the same item. The particular ranking metric may be based on rating information from multiple users. The particular rating information for the same item may be based on user input provided by a single rating-providing user. For example, comparison component 120 may compare an 80% positive rating for a particular song with the particular rating or vote from a particular rating-providing user. Responsive to the particular rating or vote being positive, the particular rating-providing user was accurate (or rather, this particular rating or vote accurately predicted that a majority of rating-providing users would like the song). Responsive to the particular rating or vote being negative, the particular rating-providing user was inaccurate (or rather, this particular rating or vote was inaccurate in predicting that a majority of rating-providing users would like the song).

In some implementations, comparison component 120 may be configured to make comparisons between the ranking metrics for different users. For example, a first content-providing user may be ranked higher than a second content-providing user, based on an experience metric. For example, a first rating-providing user may be ranked higher than a second rating-providing user, based on an experience metric. In some implementations, comparison component 120 may be configured to make comparisons between the ranking metrics for different items of user-provided content. For example, a first item of user-provided content may be ranked higher than a second item of user-provided content, based on a particular metric. In some implementations, rankings as determined by comparison component 120 may be presented to users, e.g., through user interfaces 125 and/or client computing platforms 104.

Correlation determination component 122 may be configured to determine correlations of (values of) ranking metrics, rating information, and/or other information. In some implementations, determinations by correlation determination component 122 may be based on comparisons by comparison component 120. In some implementations, correlations may indicate and/or correspond to a level of accuracy, e.g., in predicting values of ranking metrics. In some implementations, correlations may indicate and/or correspond to predictive power. For example, a first rating-providing user may provide a positive rating for a song, whereas a second rating-providing user provides a negative rating for the same song. Assuming, e.g., a 70% positive ranking metric for this particular song among a group of more than these two rating-providing users (say, for example, a group of 100 or 1000 rating-providing users), the correlation of the first user's positive rating may be greater than the correlation of the second user's negative rating. Conversely, assuming a less than 50% positive ranking metric, the correlation of the first user's positive rating may be smaller (or less) than the correlation of the second user's negative rating.

Award distribution component 124 may be configured to determine and/or distribute awards based on (values of) ranking metrics, rating information, and/or other information. In some implementations, award distribution component 124 may distribute different types of awards for different types of actions and/or accomplishments in system 100. For example, award distribution component 124 may distribute awards based on correlations determined by correlation determination component 122. In some implementations, award distribution component 124 may distribute awards based on metrics determined by metric component 118. In some implementations, award distribution component 124 may distribute awards based on comparisons made by comparison component 120. For example, in some implementations, award distribution component 124 may distribute awards to users for completing a particular presentation of user-provided content (e.g., listening to an entire song). For example, in some implementations, award distribution component 124 may distribute awards to users for completing at least a predetermined percentage (say 50%, 60%, 70%, 80%, or 90%) of a particular presentation of user-provided content. For example, in some implementations, award distribution component 124 may distribute awards to users for content-providing user input to rate and/or vote on user-provided content (e.g., regardless of correlation and/or accuracy levels). For example, in some implementations, award distribution component 124 may distribute awards to users for content-providing user input to rate and/or vote on user-provided content in a manner such that the corresponding correlation breaches a threshold. For example, the award may be in accordance with the determined correlation such that a higher correlation effectuates a greater award and/or a different type of award. For example, a first rating-providing user may provide a positive rating for a song, whereas a second rating-providing user provides a negative rating for the same song. Assuming, e.g., a 75% positive ranking metric for this particular song among a group of more than these two rating-providing users (say, for example, a group of 100 or 1000 rating-providing users), the award distributed to the first user may be greater than the award (if any) distributed to the second user. Conversely, assuming a less than 50% positive ranking metric, the award distributed to the first user (if any) may be smaller (or, in some implementations, less) than the award distributed to the second user.

In some implementations, distribution of an award may include a modification of the account information of a particular user. In some implementations, awards may include in-system status, increased influence in future rating/ranking, and/or other perks. For example, a balance of a virtual object and/or currency as maintained in the account information of the particular user may be increased. In some implementations, distribution of an award may include an increase of a value of the experience metric of a particular user. In some implementations, a balance of a virtual object and/or currency may be recorded (and/or modified) on a decentralized ledger, including, e.g., blockchain 111a. In some implementations, distribution component 124 may be configured to generate and transfer sets of instructions to decentralized database server 111 (in particular, to instruction component 134) to effectuate a transaction and/or modification on blockchain 111a (e.g., such a transaction and/or modification may implement the distribution of an award).

Revenue information component 136 may be configured to receive revenue information from users. In some implementations, revenue information may represent revenue received by individual content-providing users. In some implementations, revenue may be received by content-providing users through one or more types of revenue source. For example, in some implementations, particular revenue information may represent revenue receive through a combination of multiple types of revenue and/or multiple types of revenue source. For example, a particular content-providing user may receive a combination of a first type of revenue (from a first type of revenue source) and a second type of revenue (from a second type of revenue source). For example, the first type of revenue may be sales of individual items of user-provided content (e.g., provided by the particular content-providing user). For example, the second type of revenue may be donations by users to the particular content-providing user (e.g., either one-time donations such as tips, recurring donations, and/or a combination of both). For example, a particular type of revenue may be from a particular type of revenue source, such as participative-support exchanges. In some implementations, certain types of revenue may be specific to individual items of user-provided content. Alternatively, and/or simultaneously, in some implementations, certain types of revenue may be specific to individual content-providing users (but not, e.g., to individual items of content provided by such an individual content-providing user). In some implementations, a particular participative-support exchange may be an exchange between a particular content-providing user and another user. This exchange may exchange an amount of a currency for a portion of future revenue that is specified (i.e., the type of revenue may be specified, the type of revenue source may be specified, one or more periods may be specified to determine whether revenue contributes to the specified future revenue, the pertinent items of user-provided content may be specified, etc. etc.). For example, the particular revenue may be (future) revenue that is to be received by the particular content-providing user. The particular revenue may be based on revenue from one or more types of revenue source (e.g., a combination of multiple types of revenue source). In some implementations, the currency may be a fiat currency. In some implementations, the currency may include a virtual currency and/or a crypto-currency. In some implementations, received revenue may include multiple types of currency. In some implementations, received revenue may be limited to certain items of user-provided content, and/or certain types of user-provided content. In some implementations, received revenue may include revenue for items of user-provided content that did not exist at the time of the particular participative-support exchange. In other words, a particular participative-support exchange may apply to future (i.e., to-be-released) items of user-provided content, such as, by way of non-limiting example, songs that have not been created yet at the moment of the particular participative-support exchange.

Revenue determination component 138 may be configured to determine revenue for individual content-providing users, in particular received user-specific revenue. Revenue determination component 138 may be configured to differentiate different types of revenue, different types of revenue source, and/or other characteristics of revenue that may be used to determine whether received revenue contributes towards revenue as specified in particular participative-support exchanges. For example, in some implementations, information regarding such participative-support exchanges may have been received by revenue information component 136. In some implementations, content-providing user-specific revenue information (e.g., as determined by revenue determination component 138) may be stored and/or otherwise recorded in user account information and/or blockchain 111a. In some implementations, determinations by revenue determination component 138 may be made repeatedly, e.g., at regular intervals. For example, once a month revenue determination component 138 may determine, per content-providing user and/or per participative-support exchange, what the (specified) received revenue is.

Revenue distribution component 140 may be configured to determine and/or distribute portions of (received) revenue. In some implementations, revenue distribution component 140 may determine and distribute portions of received revenue in accordance with individual participative-support exchanges. For example, revenue distribution component 140 may determine a specified percentage (say, 5%) of received revenue (as determined by revenue determination component 138), and distribute this determined amount to the appropriate user(s). In some implementations, the determined portion of certain specified revenue may be a percentage (e.g., 1%, 2%, 3%, 4%, 5%, 6%, 7%, 8%, 9%, 10%, or more than 10%, or between 1-5%, between 4-10%, between 8-15%, etc. etc.). In some implementations, the determined portion of certain specified revenue may be a fixed amount of, say, $1, $2, $3, $4, $5, $10, $20, and/or another amount (in some implementations, the fixed amount may be conditioned on the certain revenue exceeding some limit, e.g., at least the fixed amount itself). By way of non-limiting example, for a particular content-providing user, a particular participative-support exchange may have occurred with another user, for a portion of 4% of any type of received revenue from donations. In some implementations, determinations and distributions by revenue distribution component 140 may be made repeatedly, e.g., at regular intervals such as 1 month, 2 months, 3 months, 4 months, 6 months, 1 year, or more than 1 year. Assume that the particular content-providing user received $200 in one-time and recurring donations for a specific month. For that specific month, revenue distribution component 140 may determine that the portion of received revenue in accordance with the particular participative-support exchange equals 4% of $200, or $8. Accordingly, $8 may be distributed to the other user for that specific month. As another example, a different participative-support exchange may have occurred with a different user, for a portion of 3% of any type of received revenue from both donations and sales. Assume, for that specific month, that the particular content-providing user received $100 in sales. Accordingly, revenue distribution component 140 may determine that the portion of received revenue in accordance with this different participative-support exchange equals 3% of $200, plus 3% of 100, or $9.

Exchange component 142 may be configured to facilitate exchanges of rights pertaining to participative-support exchanges. For example, exchange component may facilitate exchanges between users of either ownership rights, distribution rights, and/or other rights pertaining to participative-support exchanges. For example, rights pertaining to participative-support exchanges may be recorded on blockchain 111a. For example, in some implementations, participative-support exchanges may be implemented as smart contracts that are recorded on blockchain 111a. An exchange from an owner of the rights to a particular participative-support exchange to another user may be recorded on blockchain 111a as a transaction between the owner and the other user. For example, an exchange from an owner of the distribution rights pertaining to a particular participative-support exchange to another user may be recorded on blockchain 111a as a transaction between the owner and the other user.

Recommendation component 144 may be configured to determine recommendations for amounts of currency to be exchanged for certain rights for participative-support exchange. For example, recommendations may increase responsive to the related monthly distributions increasing. For example, recommendations may decrease responsive to the related monthly distributions decreasing. Recommendation component 144 may analyze an equivalent value for certain particular ownership and/or distribution rights. In some implementations, recommendation component 144 may be configured to present determinations and/or recommendations to users. By way of non-limiting example, distribution rights to a particular participative-support exchange may have reliably caused monthly distributions of $10. Perhaps recommendation component 144 may recommend a value of $100 for these distribution rights. In some implementations, recommendations by recommendation component 144 may be based, at least in part, on recorded transactions of other rights, as recorded in transactions on blockchain 111a.

In some implementations, server(s) 102, client computing platform(s) 104, and/or external resources 126 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more (hardware) processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, servers 102 may include one or more content servers 102a.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116, 118, 120, 122, 124, 132, 134, 136, 138, 140, 142, and/or 144, and/or other components. Processor(s) 130 may be configured to execute components 108, 110, 112, 114, 116, 118, 120, 122, 124, 132, 134, 136, 138, 140, 142, and/or 144, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

In some implementations, system 100 may include one or more decentralized database servers 111 configured to host, implement, and/or otherwise provide one or more blockchains 111a. In some implementations, decentralized database server(s) 111 may include one or more of electronic storage 128a, processor(s) 130a, machine-readable instructions 106a, and/or other components. Electronic storage 128a may be similar to electronic storage 128 as described elsewhere in this disclosure, though included in decentralized database server(s) 111. Processor(s) 130a may be similar to processor(s) 130a as described elsewhere in this disclosure, though included in decentralized database server(s) 111. Machine-readable instructions 106a may be similar to machine-readable instructions 106 as described elsewhere in this disclosure, though included in decentralized database server(s) 111. Blockchain 111a may be used to record and/or otherwise store account information for users of system 100, as well as other information related to the operation of system 100.

In some implementations, blockchain 111a may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain 111a. The smart contracts may be stored on blockchain 111a. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

Blockchain 111a may implement a decentralized ledger that records rights pertaining to digital assets. For example, a blockchain is a type of ledger, as well as a type of decentralized database that records rights pertaining to digital assets. A given (digital) asset may be owned by a particular user. An asset may include anything of material value or usefulness that is owned by or on behalf of one or more users. In some implementations, a virtual item may be represented by a digital asset that is recorded on blockchain 111a. In some implementations, a right pertaining to an object (e.g., a distribution right) may be an asset, the object being a physical or a virtual item. Multiple rights may form a set of rights or a bundle of rights that may be transferred and/or otherwise acted on and/or operated on together. For example, rights may include one or more of a right to use, a right to sell, a right to destroy, a right to certain types of distributions, and/or other rights. For example, in some implementations, rights pertaining to a virtual item (e.g., ownership) may be recorded on blockchain 111a. In some implementations, tokens may be a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of blockchain 111a.

In some implementations, blockchain 111a may register transactions that modify ownership (and/or other rights) pertaining to digital assets. A smart contract may implement a (type of) digital asset. For example, a smart contract may implement at least a part of a participative-support exchange. In some implementations, once a smart contract has been added to a blockchain, the smart contract may be referred to as published, posted, registered, and/or recorded. Elements of blockchain 111a may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information. By way of non-limiting example, digital assets may represent virtual items. In some implementations, virtual items may include one or more of (user-specific) metrics, (user-specific) balances, accomplishments, (user-specific) awards, toys, characters, accessories, in-system abilities, in-system skills, tools, pets, access rights within an online game, and/or other virtual items. In some implementations, virtual items may refer to any item or object within a gaming platform that a user may use, own, sell, trade, destroy, and/or otherwise effectuate a change of ownership of.

In some implementations, blockchain 111a may be publicly accessible and append-only. In some implementations, existing blocks of blockchain 111a can substantially not be altered or deleted, unless multiple copies are altered. This is unlikely to happen provided that multiple copies of blockchain 111a are stored on different computing platforms, e.g., in different geographical locations. Blockchain 111a may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

In some implementations, decentralized database server(s) 111 may include record component 132, instruction component 134, and/or other components. Record component 132 may be configured to record rights pertaining to digital assets on decentralized database server(s) 111 and/or blockchain 111a. In some implementations, record component 132 may record rights on a decentralized ledger implemented by decentralized database server 111. For example, the decentralized ledger may be a blockchain such as blockchain 111a. In some implementations, record component 132 may add, modify, and/or remove recorded rights. For example, in accordance with received instructions, record component 132 may transfer ownership of a particular digital asset from a first owner to a second owner (e.g., from an original owner to a new owner). In some implementations, record component 132 may be arranged, organized, and/or otherwise included in decentralized database server 111.

The recorded rights may include ownership rights, distribution rights, and/or other rights. For example, particular recorded rights may reflect ownership of a particular digital asset by a particular user. Recorded rights may be asset-specific. For example, distribution rights for a particular digital asset may designate rights to certain distributions of benefits upon an exchange involving the particular digital asset. For example, the asset-specific distribution rights for a particular digital asset may include one or more of (i) a right owned by a different user to a part of the benefits upon an exchange, (ii) a right owned by one or more stakeholders of system 100 to a part of the benefits upon an exchange, and/or other distribution rights. These parts of a benefit may have different sizes, percentages, and/or conditions.

Instruction component 134 may be configured to receive (sets of) instructions to add, modify, and/or remove recorded rights in blockchain 111a. For example, instruction component 134 may receive one or more sets of instructions from other components in system 100, including but not limited to award distribution component 124. Instruction component 134 may provide received sets of instructions to record component 132 for execution. In some implementations, instruction component 134 may be arranged, organized, and/or otherwise included in decentralized database server 111. In some implementations, user account information may be stored, at least in part, on blockchain 111a. For example, individual user accounts may include information that links to and/or otherwise refers to blockchain 111a. For example, a balance of credits, points, currencies, metrics, and/or other information may be recorded on blockchain 111a. In some implementations, distribution of an award may include a modification of a balance (and/or other information) on blockchain 111a.

Figure 3:
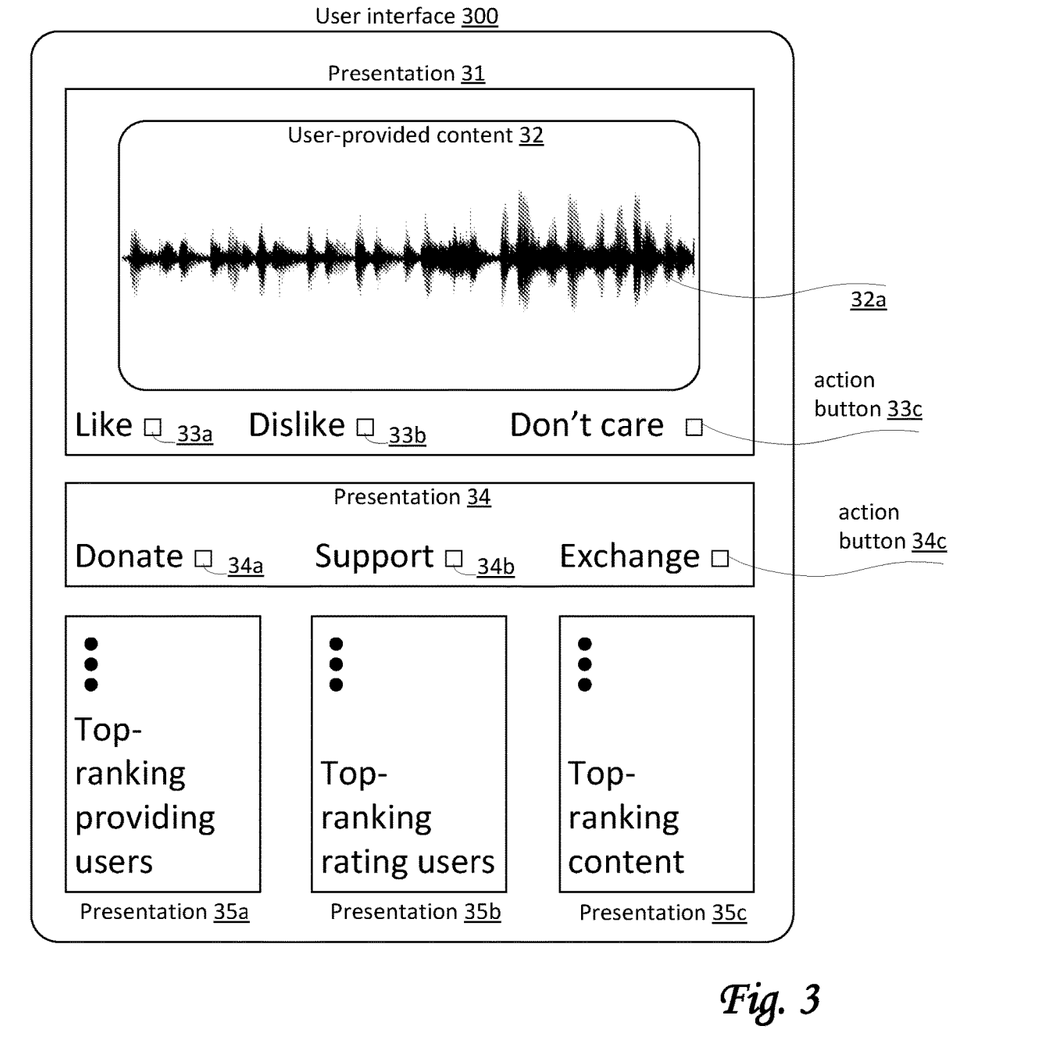
FIG. 3 illustrates a user interface, as may be presented to the users of a system as described, in accordance with one or more implementations.

By way of non-limiting example, FIG. 3 depicts a user interface 300, as may be presented to individual users through particular user interfaces 125. User interface 300 may include one or more presentations, e.g., a presentation 31, a presentation 34, a presentation 35a, a presentation 35b, a presentation 35c, and/or other presentations. Presentation 31 may include user-provided content 32 (e.g., a song or a video, as represented by audio signals 32a). Presentation 31 may further include graphical user interface elements to facilitate interaction between a user and user interface 300. Here, the graphical user interface elements include action buttons (e.g., action buttons 33a, 33b, and 33c) that enable an individual user to interact. For example, one particular action button (action button 33a, labeled "Like") would, upon activation by the individual user, provide the user input to system 100 that represents a positive rating of user-provided content 32. For example, one particular action button (action button 33b, labeled "Dislike") would, upon activation by the individual user, provide the user input to system 100 that represents a negative rating of user-provided content 32. For example, one particular action button (action button 33c, labeled "Don't care") would, upon activation by the individual user, provide the user input to system 100 that represents neither a positive nor a negative rating of user-provided content 32.

Presentation 34 may include graphical user interface elements to facilitate interactions between a user and user interface 300. Here, the graphical user interface elements include action buttons (e.g., action buttons 34a, 34b, and 34c) that enable an individual user to interact. For example, one particular action button (action button 34a, labeled "Donation") would, upon activation by the individual user, enable the user to make a donation for a particular content-providing user, in particular, the content-providing user that provided user-provided content 32. For example, one particular action button (action button 34b, labeled "Support") would, upon activation by the individual user, enable the user to agree to a participative-support exchange with a particular content-providing user, in particular, with the content-providing user that provided user-provided content 32. For example, one particular action button (action button 34c, labeled "Exchange") would, upon activation by the individual user, enable the user to exchange a previously-made participative-support exchange with a different user.

Presentation 35a presents a ranking of content-providing users of system 100. Presentation 35b presents a ranking of rating-providing users of system 100. Presentation 35c presents a ranking of user-provided content of system 100. Information presented in presentations with ranking information, such as presentations 35a, 35b, and 35c, may be based on determinations and/or comparisons by comparison component 120.

Figure 4A:
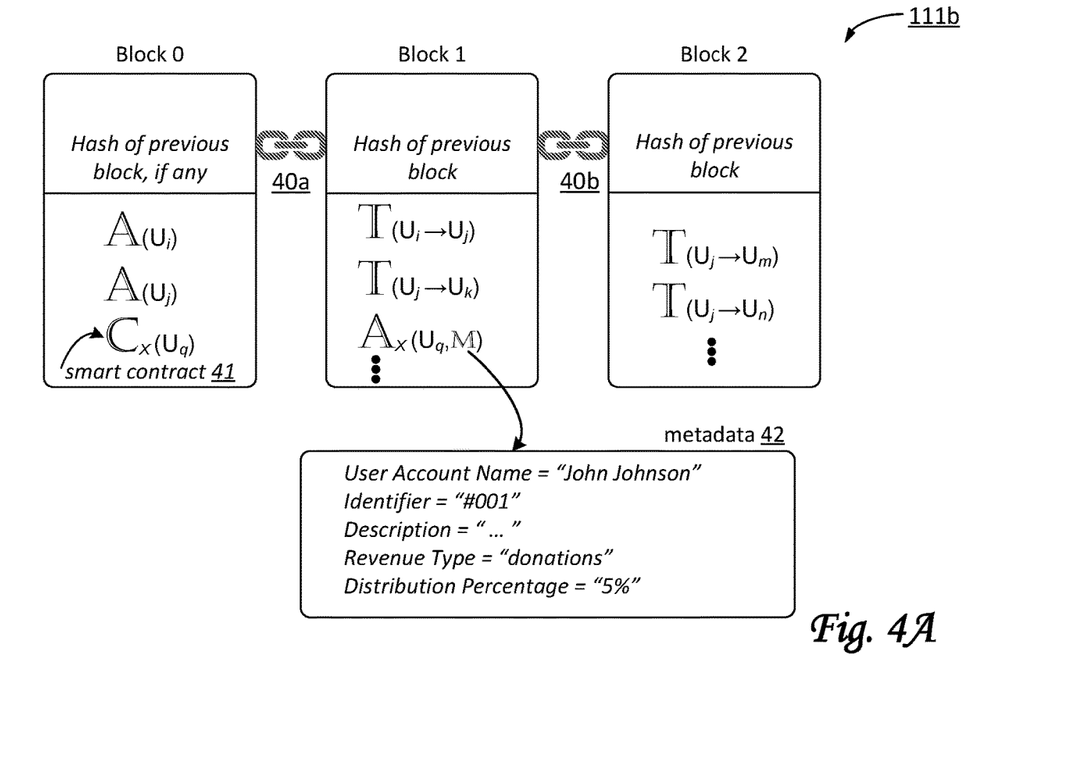
FIGS. 4A-4B illustrate exemplary blockchains as may be used by a system configured for determining and rewarding accuracy in predicting ratings of user-provided content, in accordance with one or more implementations.

By way of non-limiting example, FIG. 4A illustrates a blockchain 111b that includes a block 0, a block 1, and a block 2. As time progresses, more blocks may be added to blockchain 111b. The blocks within blockchain 111b are ordered. As shown in block 0, three assets (indicated by a capital "A" or "C") are created and/or generated, and subsequently assigned to three users or players: a first asset is assigned to user i (Ui), a second asset is assigned to user j (Uj), and a third asset is a smart contract 41 (indicated by a capital "C") that is assigned to or owned by user q (Uq). Smart contract 41 may implement a (limited) number of digital assets of a given type "X", such as, e.g., participative-support exchanges. A function call to a function defined by smart contract 41 (e.g., to request a particular type of usage, creation, and/or issuance of a digital asset of type "X") may be depicted and/or implemented as a transaction (e.g., the function may be invoked in exchange for consideration). In some implementations, smart contract 41 may have been posted to blockchain 111b by (or on behalf of) an owner or creator (here, user q). As used in the context of blockchains, assignments may record ownership. These assets and smart contracts may be individually manifested, deployed, and/or instantiated through a record component similar to record component 132 (see FIG. 1). Block 1 is connected to block 0 (as indicated by a link 40a), for example by including a (hashed) address of block 1 in block 0, or vice versa. Likewise, block 1 is connected to block 2, as indicated by a link 40b.

In block 1, one asset (labeled Ax) is assigned to user q (Uq), for example by associating an address of user "q" with asset Ax. Asset Ax may represent an individual digital asset of type "X", which may represent and/or implement a participative-support exchange. Asset Ax may be created and/or issued by invoking one or more function calls to smart contract 41. Asset Ax may have associated metadata 42 (indicated by a capital "M"), which may include and/or link to different types of information, including but not limited to one or more of a user account name for a content-providing user (here, "John Johnson", who could be an artist), identifier, description, revenue type, distribution percentage, and/or other information, as depicted. Additionally, block 1 includes two transactions (indicated by a capital "T"): a first transaction from user "i" to user "j", and a second transaction from user "j" to user "k". Block 2 includes a first transaction from user "j" to user "m", and a second transaction from user "j" to user "n". In some implementations, based on the contents of the blocks, any user of blockchain 111b may determine the current assets of blockchain 111b, and the balances and/or inventories of any user (including user "q"). In some implementations, the balances and/or inventories of a particular user may be verified prior to adding a transaction that reduces or otherwise modifies that particular user's balance and/or inventory. For example, an individual user may not be allowed to transfer assets the individual user does not own.

Figure 4B:
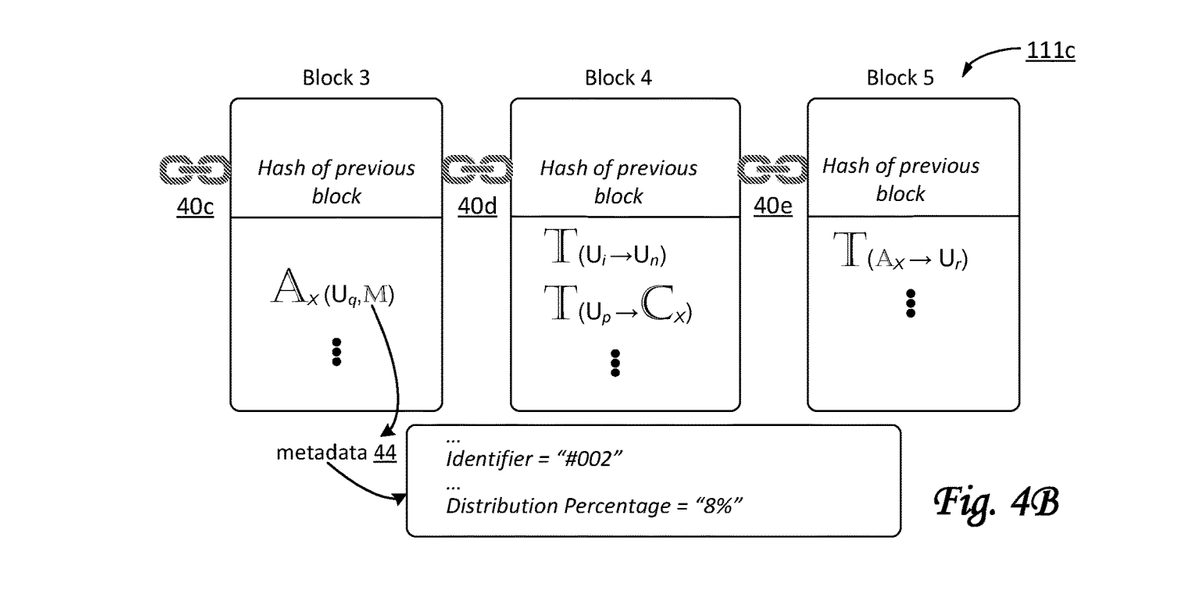

By way of non-limiting example, FIG. 4B illustrates a blockchain 111c that includes the same blocks as blockchain 111b of FIG. 4A, plus additional blocks (block 3, block 4, block 5) that have been appended to the blockchain. Block 3 may be connected to block 2 (as indicated by a link 40c), block 4 may be connected to block 3 (as indicated by a link 40d), and block 5 may be connected to block 4 (as indicated by a link 40e). In block 3, another asset (labeled Ax, having associated metadata 44) of type "X" is assigned to user "q" (Uq). At least the identifier (here, "#002") in metadata 44 will be different than the identifier in metadata 42 of FIG. 4A. Perhaps this asset represents and/or implements a different participative-support exchange for the same content-providing user ("John Johnson"), but at a different distribution percentage of 8%. Block 4 includes two transactions (indicated by a capital "T"): a first transaction from user "i" to user "n". For example, the transaction may represent a purchase of a first virtual item by user "n". Additionally, block 4 includes a second transaction from user "p" to the same smart contract as depicted in block 0. For example, the second transaction may represent user "p" offering to exchange a particular digital asset of the given type "X" (with identifier "#002") for a particular benefit, e.g., of some amount of currency. A user who provides the particular benefit may receive ownership rights and distribution rights pertaining to the particular digital asset. Block 5 includes a transaction (indicated by a capital "T") involving the particular digital asset of the given type "X" (with identifier "#002", now owned by user "p"). For example, the transaction in block 5 may modify the user that benefits from the distributions to user "r", while maintaining the ownership rights with user "p".

Referring to FIG. 1, user interfaces 125 may be configured to facilitate interaction between the users and system 100 and/or between the users and client computing platforms 104. For example, user interfaces 125 may provide an interface through which the users may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between users.

It should be appreciated that although components 108, 110, 112, 114, 116, 118, 120, 122, 124, 132, 134, 136, 138, 140, 142, and/or 144 are illustrated in FIG. 1 as being implemented within a single processing unit, in implementations in which processor(s) 130 includes multiple processing units, one or more of components 108, 110, 112, 114, 116, 118, 120, 122, 124, 132, 134, 136, 138, 140, 142, and/or 144 may be implemented remotely from the other components. The description of the functionality provided by the different components 108, 110, 112, 114, 116, 118, 120, 122, 124, 132, 134, 136, 138, 140, 142, and/or 144 described below is for illustrative purposes, and is not intended to be limiting, as any of components 108, 110, 112, 114, 116, 118, 120, 122, 124, 132, 134, 136, 138, 140, 142, and/or 144 may provide more or less functionality than is described. For example, one or more of components 108, 110, 112, 114, 116, 118, 120, 122, 124, 132, 134, 136, 138, 140, 142, and/or 144 may be eliminated, and some or all of its functionality may be provided by other ones of components 108, 110, 112, 114, 116, 118, 120, 122, 124, 132, 134, 136, 138, 140, 142, and/or 144. As another example, processor(s) 130 may be configured to execute one or more additional components that may perform some or all of the functionality attributed below to one of components 108, 110, 112, 114, 116, 118, 120, 122, 124, 132, 134, 136, 138, 140, 142, and/or 144.

Figure 2:
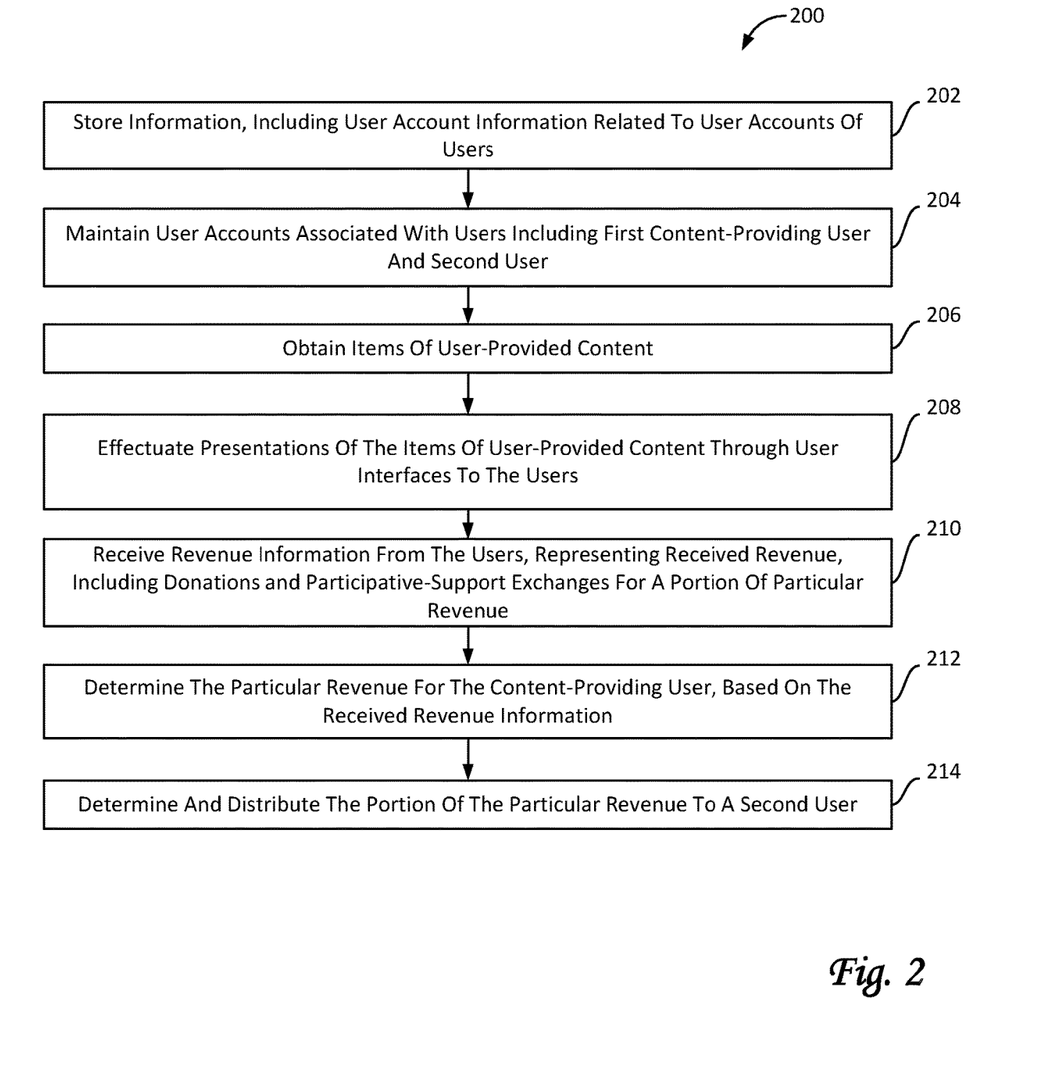
FIG. 2 illustrates a method for determining and rewarding accuracy in predicting ratings of user-provided content that is provided and rated by users, in accordance with one or more implementations.

FIG. 2 illustrates a method 200 for participative support among users, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information is stored. The stored information includes user account information related to user accounts. The user accounts are associated with the users such that a first user account is associated with the content-providing user and a second user account is associated with the second user. First account information is related to the first user account. Second account information is related to the second user account. In some embodiments, operation 202 is performed by an information storing component the same as or similar to information storing component 108 (shown in FIG. 1 and described herein).

At an operation 204, user accounts are maintained that are associated with the users. In some embodiments, operation 204 is performed by a user account component the same as or similar to user account component 110 (shown in FIG. 1 and described herein).

At an operation 206, items of user-provided content are obtained. The items include audio information. The items are associated with the content-providing users such that a first item of user-provided content is associated with the first content-providing user who provided the first item. The first item includes first audio information. In some embodiments, operation 206 is performed by a content obtaining component the same as or similar to content obtaining component 112 (shown in FIG. 1 and described herein).

At an operation 208, presentations of the items of user-provided content are effectuated through user interfaces to the users. In some embodiments, operation 208 is performed by a presentation component the same as or similar to presentation component 114 (shown in FIG. 1 and described herein).

At an operation 210, revenue information is received from the users. The revenue information represents received revenue for the content-providing users. The received revenue is a combination of one or more types of revenue source. The one or more types of revenue source include one-time donations and participative-support exchanges. A one-time donation is an individual donation from an individual user to an individual content-providing user. A participative-support exchange is a particular exchange between the second user and the content-providing user of an amount of a currency being exchanged for a portion of particular revenue received by the content-providing user. The particular revenue is based on received revenue information. In some embodiments, operation 210 is performed by a revenue information component the same as or similar to revenue information component 136 (shown in FIG. 1 and described herein).

At an operation 212, the particular revenue is determined for the content-providing user, based on the received revenue information. In some embodiments, operation 212 is performed by a revenue determination component the same as or similar to revenue determination component 138 (shown in FIG. 1 and described herein).

At an operation 214, the portion of the particular revenue is determined and distributed to the second user, in accordance with the participative-support exchange. In some embodiments, operation 214 is performed by a revenue distribution component the same as or similar to revenue distribution component 140 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for participative support among users, wherein the users include content-providing users that provide user-provided content to other users, wherein a content-providing user is associated with a first client computing platform and a second user is provided with a second client computing platform, the system comprising:

electronic storage media configured to store information, wherein the stored information includes user account information related to user accounts, wherein the user accounts are associated with the users such that a first user account is associated with the content-providing user and a second user account is associated with the second user, wherein first account information is related to the first user account, and wherein second account information is related to the second user account;

a decentralized database server configured to implement a decentralized ledger, wherein the decentralized ledger is configured to store revenue information, wherein the revenue information represents received revenue for the content-providing users;

a content server configured to effectuate presentations of user-provided content provided by the content-providing users, wherein the content server includes one or more hardware processors configured by machine-readable instructions to:

obtain items of user-provided content, wherein the items are associated with the content-providing users such that a first item of user-provided content is associated with the content-providing user who provided the first item;

effectuate presentations of the items of user-provided content through user interfaces to the users;

receive particular revenue information from the users, wherein at least some of the particular revenue information is stored on the decentralized ledger, wherein the particular revenue information represents participative-support exchanges, wherein a participative-support exchange is a particular exchange between the second user and the content-providing user of an amount of a currency being exchanged for a portion of particular revenue received by the content-providing user, wherein the particular revenue is based on received particular revenue information;

determine the particular revenue for the content-providing user, based on the received particular revenue information; and determine and distribute the portion of the particular revenue to the second user, in accordance with the participative-support exchange.

2. The system of claim 1, wherein the particular revenue for the content-providing user is determined repeatedly at specified intervals, and wherein the portion of the particular revenue is distributed repeatedly at the specified intervals to a user that owns distribution rights pertaining to the participative-support exchange.

3. The system of claim 1, wherein the presentations to the users include user interface elements to receive user input from the users, wherein the user input represents rating information that indicates particular ratings from a set of rating options, wherein the set of rating options includes at least a positive rating and a negative rating.

4. The system of claim 3, wherein the particular ratings represent assessments and/or evaluations of quality and/or merit of the items of user-provided content.

5. The system of claim 1, wherein the content-providing users has uploaded the first item of user-provided content to the content server.

6. The system of claim 1, wherein the particular revenue information represents a one-time donation, and wherein the one-time donation is a tip of a particular amount of currency.

7. The system of claim 1, wherein the particular revenue is received by the content—providing user subsequent to the second user providing the amount of the currency as part of the participative-support exchange.

8. The system of claim 1, wherein the decentralized database server comprises one or more processors configured by machine-readable instructions to:

record, on the decentralized ledger, rights pertaining to the participative-support exchanges, wherein the recorded rights reflect ownership rights and distribution rights pertaining to the participative-support exchange and the portion of the particular revenue received by the content-providing user, wherein the second user owns the recorded rights pertaining to the participative-support exchange; and receive instructions to modify the recorded rights on the decentralized ledger.

9. The system of claim 8, wherein the users include a third user, wherein the content server is further configured to:

receive exchange information, wherein the exchange information represents an individual exchange between the third user and the second user for the ownership rights and the distribution rights pertaining to the participative-support exchange and the portion of the particular revenue; and responsive to receipt of the exchange information, transfer a first set of instructions to the decentralized database server;

wherein the decentralized database server is further configured to:

receive the first set of instructions from the content server; and transfer the ownership rights and the distribution rights pertaining to the participative-support exchange and the portion of the particular revenue, from the second user to the third user, in accordance with the received first set of instructions.

10. The system of claim 9, wherein the individual exchange between the third user and the second user involves a second amount of a second currency, wherein the one or more hardware processors are further configured by the machine-readable instructions to:
    determine the second amount of the second currency as a recommendation for the individual exchange between the third user and the second user; and
    effectuate one or more presentations that include information based on the second amount of the second currency to one or both of the second user and the third user.

11. A method for facilitating participative support among users, wherein the users include content-providing users that provide user-provided content to other users, wherein a content-providing user is associated with a first client computing platform and a second user is provided with a second client computing platform, the method comprising:
    storing information, wherein the stored information includes user account information related to user accounts, wherein the user accounts are associated with the users such that a first user account is associated with the content-providing user and a second user account is associated with the second user, wherein first account information is related to the first user account, and wherein second account information is related to the second user account;
    implementing a decentralized ledger configured to store revenue information, wherein the revenue information represents revenue received for the content providing users;
    obtaining, by a content obtaining component, items of user-provided content, wherein the items are associated with the content-providing users such that a first item of user-provided content is associated with the first content-providing user who provided the first item;
    effectuating, by a presentation component, presentations of the items of user-provided content through user interfaces to the users, wherein the user interfaces are included in client computing platforms associated with the users;
    receiving, by a revenue information component, particular revenue information from the users, wherein at least some of the particular revenue information is stored on the decentralized ledger, wherein the particular revenue information represents participative-support exchanges, wherein a participative-support exchange is a particular exchange between the second user and the content-providing user of an amount of a currency being exchanged for a portion of particular revenue received by the content-providing user, wherein the particular revenue is based on received particular revenue information;
    determining, by a revenue determination component, the particular revenue for the content-providing user, based on the received particular revenue information; and
    distributing, by a revenue distribution component, the portion of the particular revenue to the second user, in accordance with the participative-support exchange.

12. The method of claim 11, wherein the particular revenue for the content-providing user is determined repeatedly at specified intervals, and wherein the portion of the particular revenue is distributed repeatedly at the specified intervals to a user that owns distribution rights pertaining to the participative-support exchange.

13. The method of claim 11, wherein the presentations to the users include user interface elements to receive user input from the users, wherein the user input represents rating information that indicates particular ratings from a set of rating options, wherein the set of rating options includes at least a positive rating and a negative rating.

14. The method of claim 13, wherein the particular ratings represent assessments and/or evaluations of quality and/or merit of the items of user-provided content.

15. The method of claim 11, wherein the content-providing users has uploaded the first item of user-provided content to the content server.

16. The method of claim 11, wherein the particular revenue information represents a one-time donation, and wherein the one-time donation is a tip of a particular amount of currency.

17. The method of claim 11, wherein the particular revenue is received by the content—providing user subsequent to the second user providing the amount of the currency as part of the participative-support exchange.

18. The method of claim 11, further comprising:
    recording, on the decentralized ledger, rights pertaining to the participative-support exchanges, wherein the recorded rights reflect ownership rights and distribution rights pertaining to the participative-support exchange and the portion of the particular revenue received by the content-providing user, wherein the second user owns the recorded rights pertaining to the participative-support exchange; and
    receiving instructions to modify the recorded rights on the decentralized ledger.

19. The method of claim 18, wherein the users include a third user, the method further comprising:
    receiving exchange information, wherein the exchange information represents an individual exchange between the third user and the second user for the ownership rights and the distribution rights pertaining to the participative-support exchange and the portion of the particular revenue;
    responsive to receipt of the exchange information, transfer a first set of instructions to the decentralized database server;
    receiving the first set of instructions from the content server; and
    transferring the ownership rights and the distribution rights pertaining to the participative-support exchange and the portion of the particular revenue, from the second user to the third user, in accordance with the received first set of instructions.

20. The method of claim 19, wherein the individual exchange between the third user and the second user involves a second amount of a second currency, the method further comprising:
    determining the second amount of the second currency as a recommendation for the individual exchange between the third user and the second user; and
    effectuating one or more presentations that include information based on the second amount of the second currency to one or both of the second user and the third user.

\* \* \* \* \*